United States Patent [19]

Blank et al.

[11] Patent Number: 5,522,554

[45] Date of Patent: Jun. 4, 1996

[54] METHOD AND DEVICE FOR PREPARING PLASTIC WASTE

[75] Inventors: Reinhard A. Blank, Steinach; Georg Ranosch, Wolfach, both of Germany

[73] Assignee: ingenieurgesellschaft fur umwelttechnik UTS mgH, Steinach, Germany

[21] Appl. No.: 231,738

[22] Filed: Apr. 25, 1994

[51] Int. Cl.$^6$ ............... B02C 11/08; B02C 21/02; B02C 23/08

[52] U.S. Cl. ............... 241/23; 241/24.14; 241/25; 241/29; 241/65; 241/69; 241/78; 241/79.1; 241/81; 241/152.2; 241/DIG. 38; 241/24.18

[58] Field of Search ............... 241/24, 29, 25, 241/23, 65, 69, 78, 79.1, 81, 60, 152.2, DIG. 38

[56] References Cited

U.S. PATENT DOCUMENTS

| | | | |
|---|---|---|---|
| 3,797,761 | 3/1974 | Neil | 241/152.2 X |
| 4,161,296 | 7/1979 | Parker et al. | 241/152.2 |
| 4,168,034 | 9/1979 | Leger | 241/152.2 X |
| 5,183,212 | 2/1993 | Boo et al. | 241/17 |
| 5,184,780 | 2/1993 | Wiens | 241/79.1 X |
| 5,279,465 | 1/1994 | Stroppiana | 241/152.2 X |
| 5,323,971 | 6/1994 | Nishibori et al. | 241/29 X |

FOREIGN PATENT DOCUMENTS

| | | |
|---|---|---|
| 0395128 | 3/1990 | European Pat. Off. . |
| 0502491 | 3/1992 | European Pat. Off. . |
| 1924640 | 5/1969 | Germany . |
| 2614730 | 4/1976 | Germany . |
| 224604 | 4/1984 | Germany . |
| 3544979 | 12/1985 | Germany . |
| 4301066 | 6/1992 | Germany . |
| 2019853 | 11/1979 | United Kingdom . |
| WO92/118312 | 10/1992 | WIPO . |

OTHER PUBLICATIONS

Mixed Plastics Recycling, B. Dubrulle d'Orchel, 4602 PE Plast Europe (1993) Jun., No. 2, Munich, DE.
Technische und wirtschaftliche Aspekte der Wiederverwertung, Bericht über die Recycle '88.
Peroxid–Kanister vo Ort recyclieren–Kanister–Recycling.
Kunststoff–Recycling auf der IFAT 87, 8. Internationale Fachmesse füEntsorgung, 19. bis 23. Mai 1987 in München.
Recycling von Kunststoffen, G. Menges, W. Michaeli, M. Bittner (Herausgerber), Mir 173 Bildern und 74 Tabellen, Carl Hanser Verlag München Wein.

Primary Examiner—Timothy V. Eley
Attorney, Agent, or Firm—Antonelli, Terry, Stout & Kraus

[57] ABSTRACT

For preparing plastic waste composed of different plastics, possibly combined with other materials, for further processing, for example, as additives for construction. A method of the invention comminutes the waste, metals are separated out, the plastic waste is agglomerated, and the agglomerated waste is comminuted further. A device according to the invention for performing the method uses comminution devices, metal separators, and at least one agglomerator. The entire device is completely mobile and equipped with its own power supply.

37 Claims, 6 Drawing Sheets

METHOD AND DEVICE FOR PREPARING PLASTIC WASTE

BACKGROUND OF THE INVENTION

1. Field of the Invention

The invention relates to a method for preparing plastic waste composed of different plastics, possibly in combination with other materials, for further processing as well as a device for preparing plastic waste composed of different plastics, possibly in combination with other materials, for further processing.

2. Description of the Prior Art

Today waste is collected so that so-called valuable materials are placed in a container in the homes and other materials which can decompose and rot or are heavily contaminated are placed in another container.

The valuable materials can likewise be readily contaminated. They consist of a wide variety of plastics, such as polyethylene, polypropylene, polystyrene, PVC, etc., cardboard, paper, metal, possibly other forms of cellulose, etc. At a waste collection site, the basically different materials are separated and sorted, namely plastics on the one hand, and cardboard and large metal objects on the other.

In addition, a fine sorting of the different plastics is also provided in part, especially when there is a demand for special recyclable plastics such as polypropylene or the like, and a very special type of plastic can be deliberately sorted out without great expense, yogurt containers for example.

However, many objects made of a wide variety of plastics that are easily contaminated remain in the plastic waste or in the plastic fraction, and may be combined with other materials such as the remaining metal lids of yogurt containers of the like. Further separation and sorting is often not possible for technical reasons, and in part is either not desirable or not feasible for economic reasons.

In the past, these plastics which could not be separated further, prepared, or processed, and often contained foil, plastic bags, etc., were baled and stored as such temporarily at the waste collection site. Intermediate storage in bales entails considerable risks, since spontaneous combustion can occur very easily and in at least one specific case it has happened that plastic bales stored in precisely this manner caught fire. As a result, particularly if the plastic waste contains PVC, dioxin can be released in the fire.

Another disadvantage of immediately subsequent intermediate storage in plastic bales consists in the fact that the contaminated material compressed into the bales is not biologically inert. Bacteria work in the components of the contamination and cause the bales to expand and their volume to increase, even causing the wraps to burst.

The problems recited above result partly from the fact that this plastic material does not accumulate more or less continuously or semi-continuously, but that it arrives at a collection point on one or at most two days a week or every fourteen days, but for logistical reasons must be processed further immediately even if it is only for intermediate storage in the form of plastic bales or in some other fashion. In addition, the volume of waste accumulating at a collection point is often so small that stationary processing machinery, such as regranulating machinery, is used for only a short time, namely a few hours, since there is not sufficient waste volume available to use such machinery over the entire work time of a week or fourteen days until the next day on which the corresponding waste containing valuable materials arrives.

SUMMARY OF THE INVENTION

Taking its departure from this prior art and avoiding the above-mentioned disadvantages, the aim of the invention is to provide a method and a device which provide for optimum processing of plastic waste that has not been finally sorted and consists of different plastics, possibly combined with other materials, such as paper, cardboard, and metal, so that in particular the risk of fire as well as biological processes in the processed material are eliminated.

According to the invention this goal is achieved by a method wherein the waste is comminuted, and, if present, metals are separated, with the plastic waste being agglomerated, and the agglomerated waste being further comminuted further. A device according to the invention especially for performing the method provides for comminution devices, metal separators, and at least one agglomerator.

According to preferred embodiments of the process according to the invention, provision is made such that the plastic waste is comminuted in two stages before agglomeration, with voluminous plastic parts in particular being force-fed to a first comminution stage, and the plastic waste components being comminuted to a size of approximately 10 mm before the metal is separated. In another preferred embodiment of the method according to the invention, a first metal separation takes place before the first comminution stage, said separation being performed by means of a metal detector as well as manual removal of metal parts. In this manner, larger metal parts that remain in the plastic waste after the preliminary sorting will have already been removed prior to comminution.

Further embodiments of the first method according to the invention provide for the magnetizable metals to be removed from the plastic waste by magnets and for nonferrous metals to be removed by electrostatic separation. In this manner, only metals that have been separated by comminution and preliminary comminution from the rest of the plastic are separated out, while metal residue adhering to the plastic particles, such as the residue of yogurt lids, etc. can be fed for further processing of the plastic particles without disrupting the process provided the plastic component is by far in the majority.

In an another embodiment, provision can be made such that the comminuted plastic waste particles are stored intermediately prior to agglomeration to ensure continuous agglomeration. Agglomeration of the plastic particles is performed by melting them and then forcing them through a sieve or a matrix. After quenching with water and/or after cooling, an additional comminution down to particle sizes of 3 mm or less can follow. For this purpose and also for further processing, cooling of the plastic particles that heat up during agglomeration and comminution is advisable, with cooling to a maximum of 40° C. being provided.

During agglomeration and further comminution, a temperature range should be selected that is in the range between 80° and 100° C. in order firstly to avoid damage or destruction of the plastic properties Of the plastics as a result of overly high temperatures, and secondly, by using sufficiently high temperatures above 80° C., to achieve destruction of the microorganisms contained in the dirt particles in the waste so that a hygienically acceptable and biologically inert end product is obtained. It has been found that this can easily be achieved by means of the method according to the invention and the device according to the invention. Even after prolonged storage, the material does not develop odors.

Before the plastic waste is fed for further comminution, in in of the method according to the invention, provision is made such that the plastic particles that already have a predetermined grain size are separated from the rest of the plastic particles. Improvements provide that magnetic parts are separated from the plastic particles that are to be comminuted further. As a result, the metals that have been separated by comminution (with preliminary comminution) from the rest of the plastic are removed from the plastic waste by means of a magnetic roller. The metal residue adhering to the plastic particles is fed for further comminution without causing problems provided the plastic component is by far the largest.

A device according to the invention is preferably constructed so that a receiving device with a preliminary comminutor for voluminous parts is provided, with the preliminary comminutor being provided with cutting mills and forced feed with a hydraulically actuated feed ram.

Further comminution can be performed by a shredder or preliminary cutting mill with a chute.

An over-belt magnet and electrostatic metal separator for nonferrous metals can be provided for metal separation. Alternatively, the device has a magnetic roller for this purpose and a metal detector is located ahead of the preliminary cutting mill with chute.

Further preferred embodiments provide that an intermediate storage device to ensure continuous supply of the agglomerator with plastic particles is located upstream from the agglomerator and that the intermediate storage device is mounted on the agglomerator, so that the plastic chips can fall by gravity into the agglomerator, particularly with the agglomerator having a sieve or a matrix and rotary knives that force the plastic chips through the sieve after they melt.

A first cooling device is located downstream from the agglomerator in a first embodiment, with the device possibly following a final cutting mill that is adjusted so that the final particle size is 3 mm or less in diameter. In another embodiment, the agglomerator is connected with a system for supplying water. This produces quenching of the plastic particles. In addition, in the feed direction of the plastic waste to be processed, a sieve gutter is preferably provided after the agglomerator to separate the plastic waste. The plastic particles that already have the preset grain size can already be separated in this fashion and carried away by a blower with a cyclone located beneath the bottom run of the sieve gutter. For the larger plastic particles, a magnetic roller is located in the upper run of the sieve gutter to separate ferrous metals from the plastic waste.

By means of the method and the device according to the invention, especially the agglomeration and further comminution following the preparatory work steps or the work stations provided for preparing the agglomeration, granulation of the plastic material takes place.

The resultant granulate can be used in many ways, preferably in drift mining as a replacement for quartz sand and anhydrite when mixed with cement. Another advantage of this additive according to the invention for mining lies in the fact that the resultant granulate material does not absorb water, is light in weight, and therefore easily conveyable by fluid conveyors etc.

Alternatively, the material can also be hydrated later. Another area of application is as an additive to lightweight concrete, when the above-mentioned properties are also important, namely light weight and elimination of any water absorption.

According to preferred embodiments of the method, particularly in the case of use as an additive to lightweight concrete, provision can be made such that during agglomeration additives are added such as sand, corundum, silicon oxide (quartz sand), or the like.

In addition, for biological inertization prior to agglomeration, possibly also before comminution, the plastic waste can be washed. It has been found however that the above-mentioned heat treatment is completely adequate to produce a biologically inert material.

The device according to the invention, with a throughput of 1,000 kg per hour, produces 2,500 tons in a year, corresponding to a volume provided by approximately 300,000 residents a year.

In particular the invention provides a method and a device with which, in an economically extremely optimum fashion, in a technically reliable way, without high sorting cost, a wide variety of different plastics can be processed, namely can be granulated, in order thus to produce a material that is available for further use, either in the construction sector underground or as an additive for concrete, and possibly can also be chemically further processed later on, for example, by hydration.

BRIEF DESCRIPTION OF THE DRAWINGS

Further advantages and features of the invention will be evident from the claims and from the following description, when taken in connection with the accompanying drawings wherein

DETAILED DESCRIPTION OF THE PREFERRED EMBODIMENTS

Figure 1:
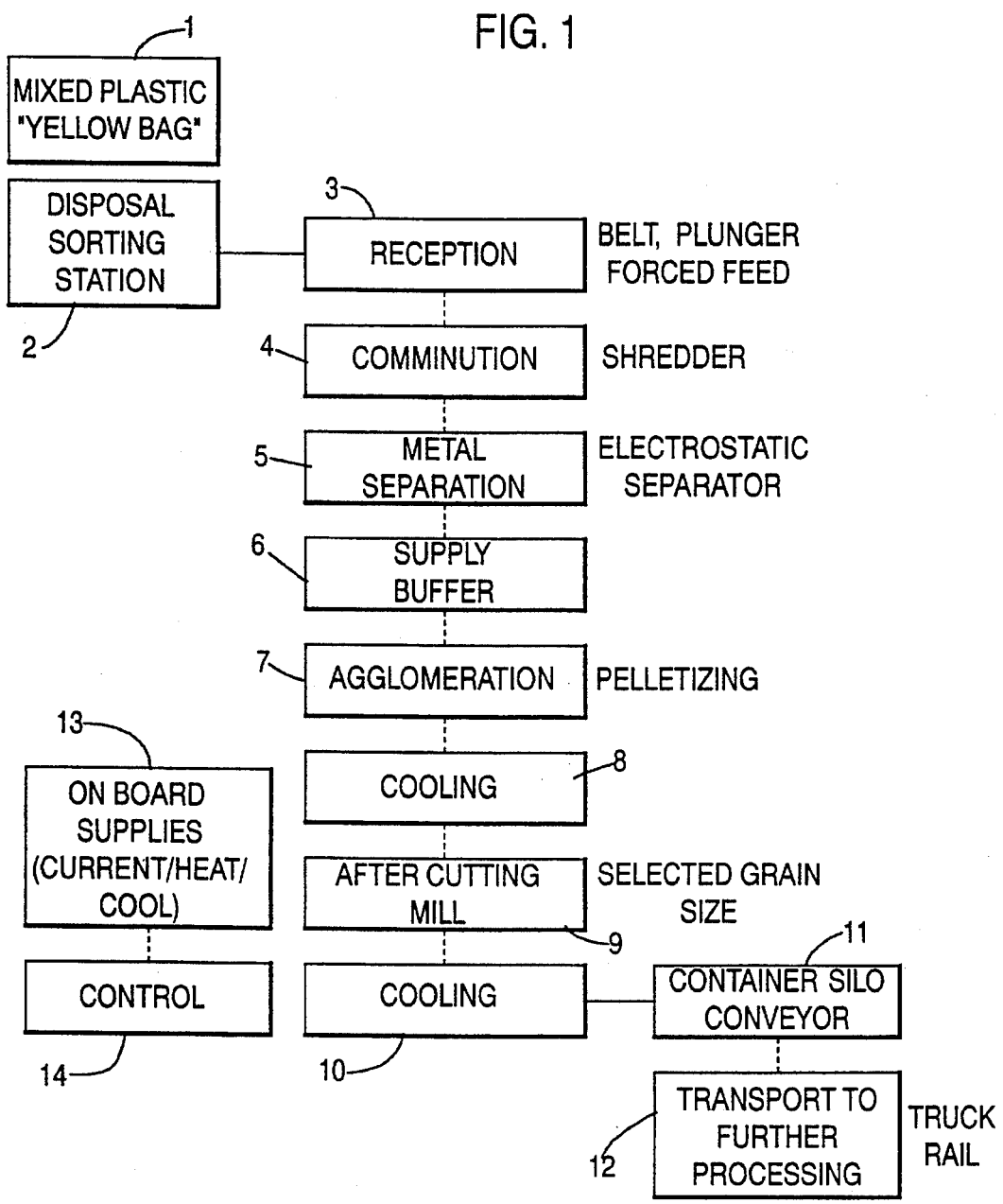
FIG. 1 is a flowchart of a preferred embodiment of the method according to the invention.

The method according to the invention starts from a waste process in which valuable materials that are contaminated relatively little if at all are collected separately from other wastes, especially those that will decay. This is indicated in FIG. 1 by the box labeled "Yellow Bag," provided with reference numeral 1. The valuable materials are fed into a sorter 2 in which sorting processes can be performed manually or partially automatically, such as sorting out very specific plastic parts from a defined plastic material, for example all yogurt containers, or sorting out paper and cardboard objects as well as metals. Only plastic waste is referred by the actual method according to the invention and hence also to the device provided according to the invention for working this method, the method being shown in the middle column on FIG. 1, with this plastic waste being present in large amounts in the mixture and containing a wide variety of different kinds of plastic such as polyethylene, polypropylene, polystyrene, PVC, and also containing combined materials including metals such as the remains of metal lids for plastic containers, paper, or cardboard, but with the plastic component necessarily being the predominant one. The method according to the invention accordingly permits the recycling for utilization of plastic wastes that will not decay within the framework described, without a high selection cost being required; more particularly, plastic waste can be prepared by the method according to the invention and fed for further processing, which is not recyclable in pure form, either because this is not technically feasible or because it is economically too expensive or because there is no need for these plastics.

The thus presorted plastic waste which is to be processed according to the invention is fed at 3 to the processing of the method according to the invention, whereby a first preliminary comminution can take place. The material is then forcibly, by, for example, a belt or a ram device, fed to a comminution that can be performed by a shredder, in which the material is reduced in size to chips having a surface diameter of 10 mm. In this comminution 4, metals of whatever kind are comminuted as well. In another method step 5, metal separation takes place, this being a double step. Firstly, magnetizable or ferrous metals are removed by means of a magnet, preferably, an "over-belt" magnet suspended over a conveyor belt, while secondly, free nonferrous metal particles that can also be relatively small (up to less than 5 mm) are removed by an electrostatic separator.

In the next main stage 7 of the method according to the invention, agglomeration of the comminuted plastic material takes place. Since this is intended to take place continuously, the material at 6 is stored intermediately in a supply buffer from which it can be drawn continuously for agglomeration, for example, merely by gravity. Agglomeration can be performed at 7 by rotary hives which melt the plastic chips because of their frictional or rubbing forces and force them simultaneously through a sieve with a preselected hole size.

Then cooling 8 of the agglomerated plastic particles takes place from a temperature of approximately 100° C. that occurs during agglomeration to a temperature of 40° C. required for further processing and transport. Cooling can be accomplished by means of air cooling or by a cooling water circuit in a cooler.

The agglomerated plastics are then comminuted once again at 9 down to a specific grain size of 3 mm or less. This can be performed by a cutting mill.

Since here again a temperature increase can occur because of the processing procedure, preferably additional cooling 10 is provided in order to cool the material back down to a maximum temperature of 40° C. This can be done in the manner described above.

The agglomerates, comminuted to the desired grain size and cooled, are then conveyed for storage, for example in a silo 11 by means of a screw or pneumatically, from which silo they can be transported further for final processing in a suitable fashion by truck and/or rail 12.

A completely autonomous current-heat-and-cold supply 13 for the method according to the invention can be provided, accomplished by a control 14.

Figure 2:
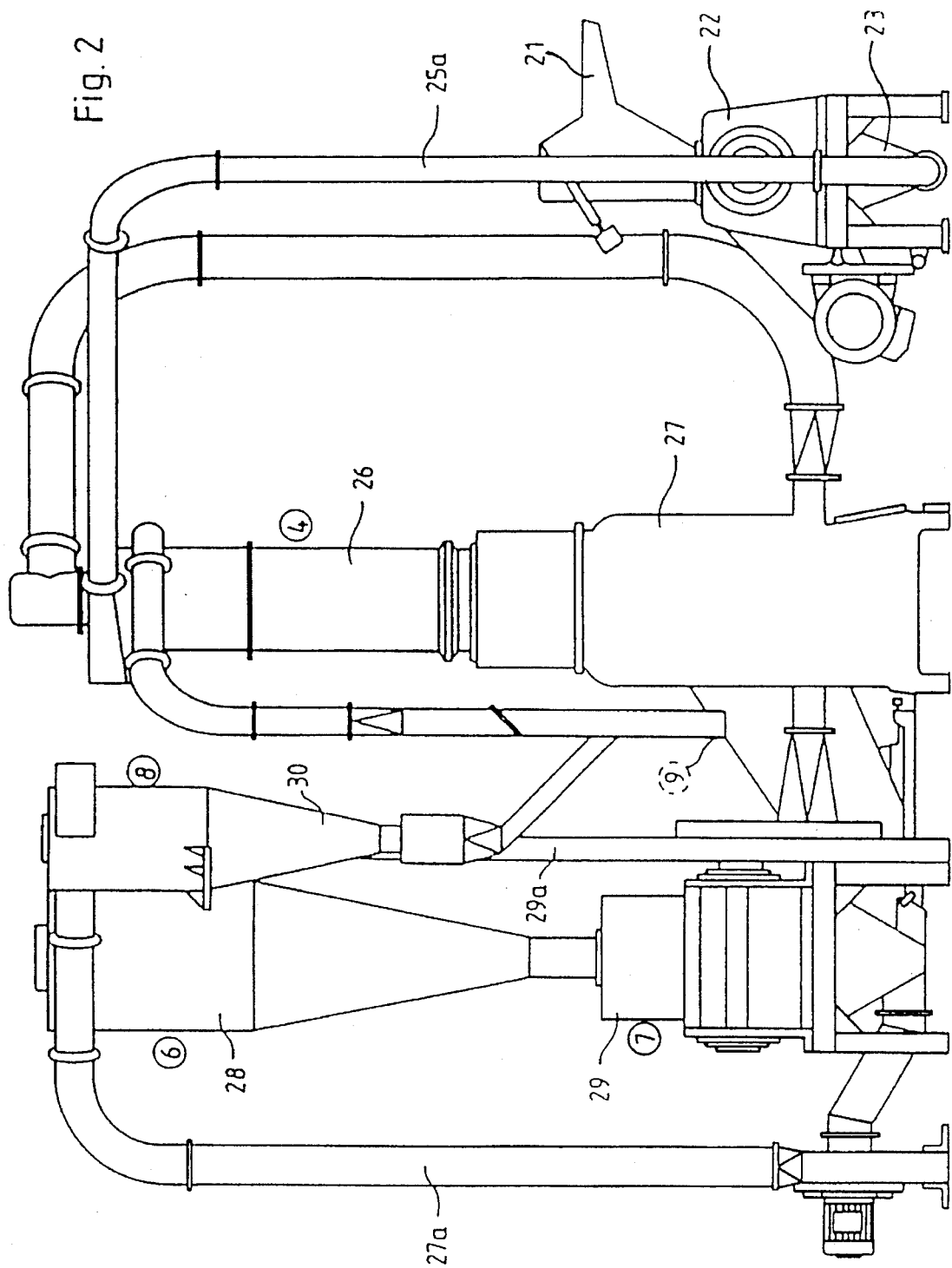
FIG. 2 is a schematic diagram of a device according to the invention for carrying out the method according to FIG. 1.
Figure 3:
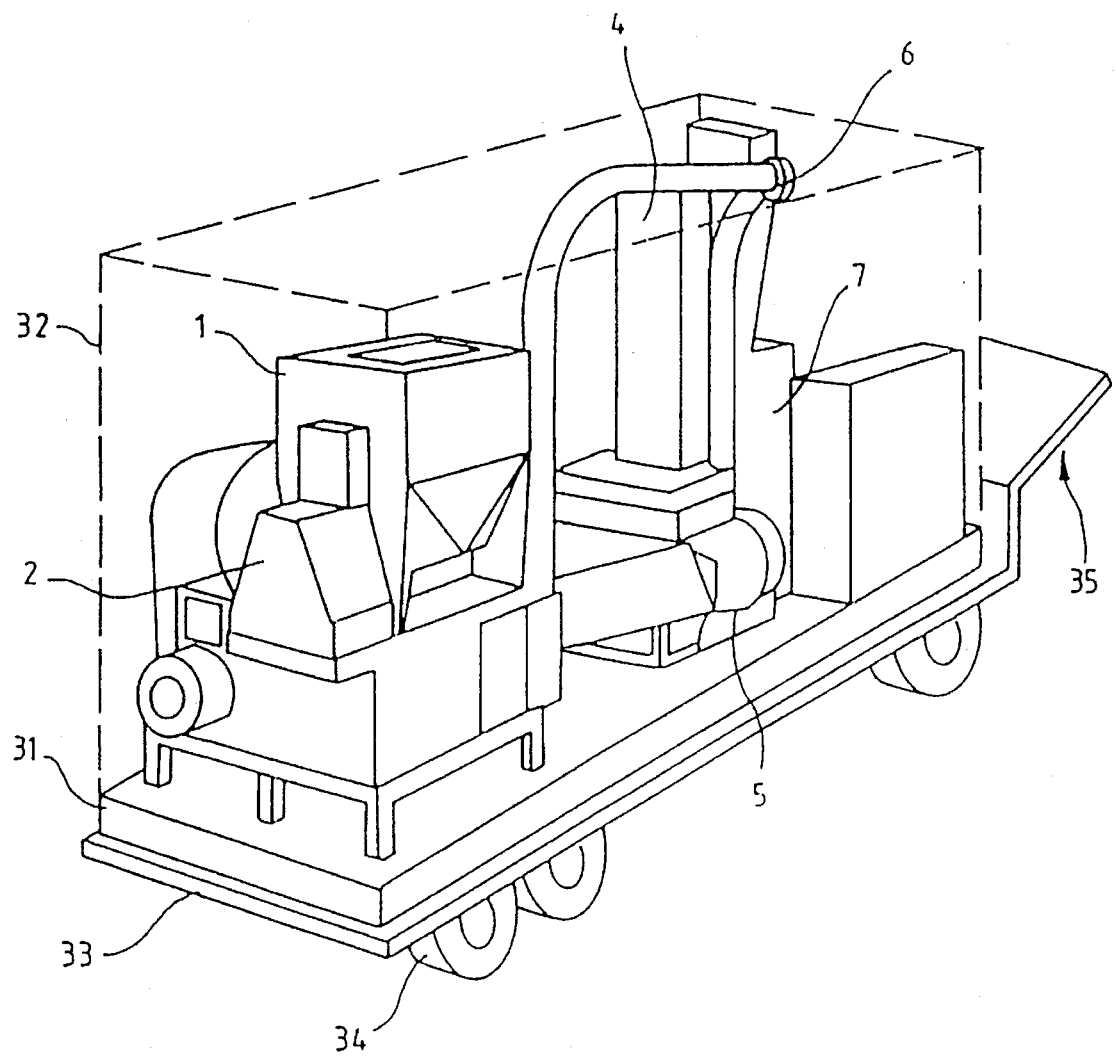
FIG. 3 is a diagram of the transportable compact device according to the invention.

A device according to the invention, as shown in FIGS. 2 and 3 initially has an input device 21 in which the plastic wastes are dumped on a conveyor belt and fed to a first preliminary comminution. For this purpose, intake device 21 can have a hydraulically actuated ram by which the plastic wastes are forced into the knives of the cutting mills, with the frequency of the pressing being continuously adjustable.

From the intake device, the possibly pre-comminuted plastics enter a comminution device 22 which is preferably made in the form of a shredder and in which they are reduced to a chip size of 10×10 mm. In this step, foreign materials such as metals are comminuted as well. The comminution device 22 is followed by a metal separator 23 which is in duplicate for two parts first an over-belt magnet and second, an electrostatic separator for nonferrous metals.

The actual core of the processing device according to the invention is the agglomerator 27 to which the comminuted plastic waste is transported by a supply buffer 26 into which it is blown by a system of pipes 25a. In this way agglomerator 27 can be supplied continuously with plastic chips for example by gravity alone.

Agglomerator 27 has rotary knives by which the plastic chips are firstly melted by frictional and rubbing forces and secondly forced through a sieve with a predetermined hole size. The speed of the rotary knives is adjustable, and is set so that melting and therefore possible agglomeration of the plastics can be performed. This results in a temperature increase of the plastic material up to about 100° C. This first produces a heat which disinfects and thus kills off microorganisms that might still be present on the contaminated plastics and secondly it avoids damaging the plastics themselves, especially polyethylene, since the plastics are supposed to retain their plastic character.

For further processing and further transport, the agglomerator is followed by a cooling device 28 to which the agglomerated plastic particles are fed by a feed system 27a. After the particles cool, they are comminuted further in a final cutting mill 29, down to a desired preselected grain size of 3 mm or less. Then additional cooling can take place in a cooler 30 to which the particles ere fed by a system of pipes 29a. From this cooling device the particles are then fed to an external storage device such as a container silo or the like from which they can be supplied for further transport.

The entire system, as can best be seen from FIG. 3, is mounted on a container bottom 31 and covered by a housing 32 indicated by the dashed lines in FIG. 3. The container bottom can be made transportable, by being placed for example on a saddle trailer 33 provided with wheels 34 and (at 35) connectable with a tractor.

Figure 4:
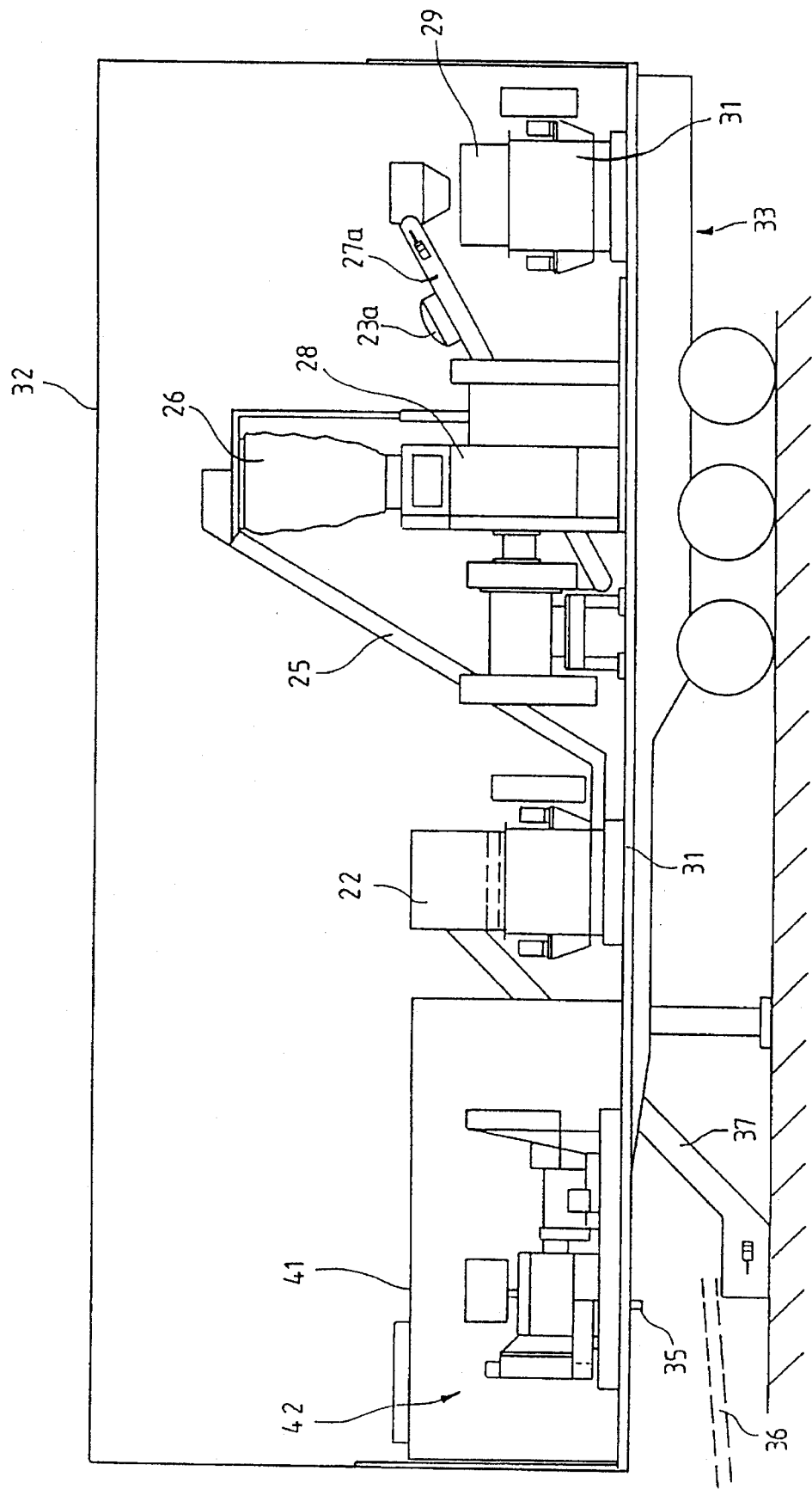
FIG. 4 is a another version of the device according to the invention in a schematic representation.

FIG. 4 shows an embodiment of the device according to the invention on a saddle trailer 33. The material is supplied by a conveyor belt 36 which can be fitted and is shown by dashed lines, and travels through a conveyor 37 into comminution device 22, preferably in the form of a mill.

Possibly the material can also be already pre-comminuted and presorted.

From the comminution device 22, the material travels by a conveyor 25, preferably, in the form of a screw first to the supply buffer or the intermediate storage 26 and from the latter into the agglomerator 28 located beneath it. The agglomerated material is therefore conveyed further and cooled by a conveyor 27a (which is therefore provided with a cooling device), whereby a metal separator 23a can be provided on conveyor 27a to separate out the last particles of metal.

The agglomerated and cooled material then reaches a final cutting mill 29 and is dispensed from there through an additional cooling device 30.

The entire system is mounted in a housing 32. It also contains a generator 42 provided with separate soundproofing 41.

Figure 5:
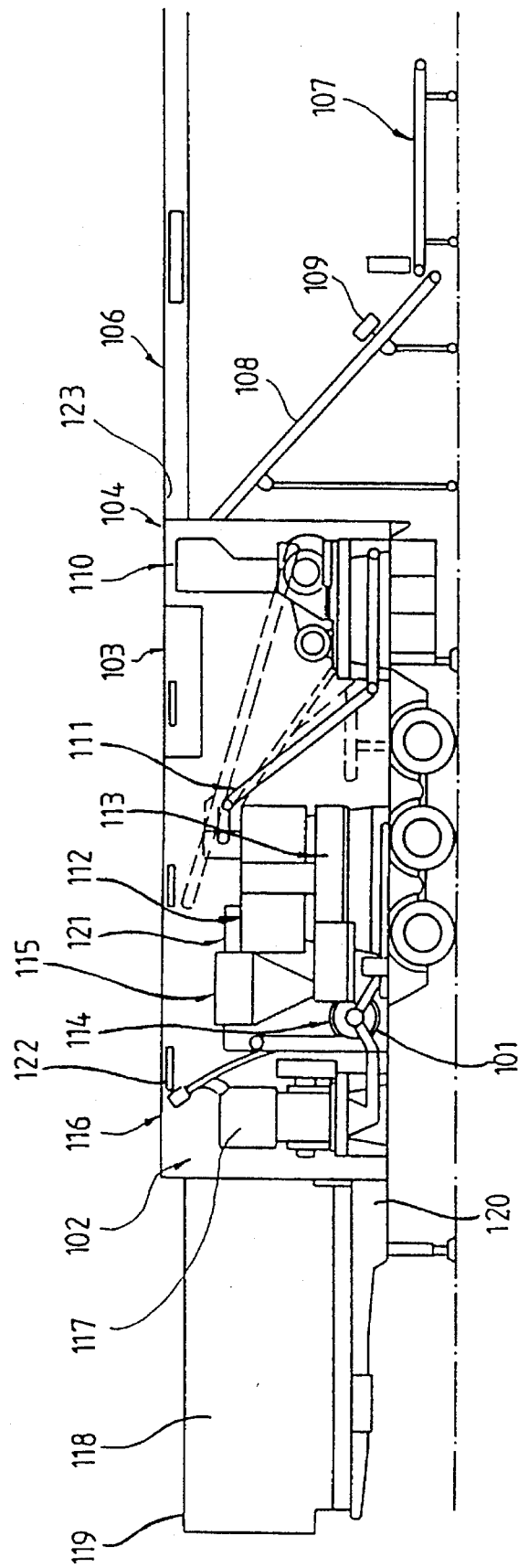
FIG. 5 is a second embodiment of the device according to the invention for working a second embodiment of the method according to the invention.
Figure 6:
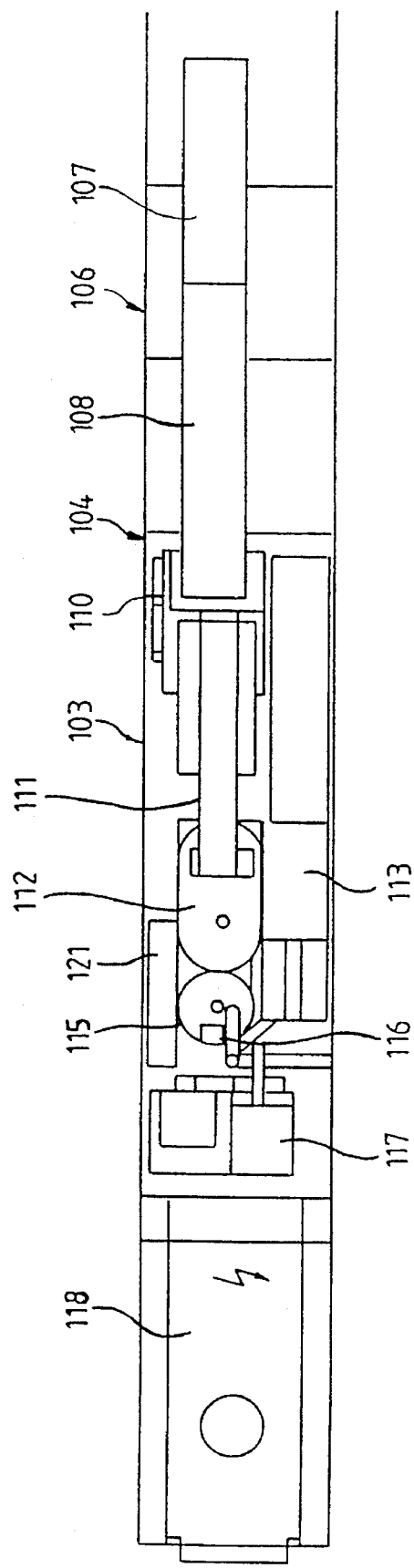
FIG. 6 is a top view of the device in FIG. 5.

FIG. 5 shows another embodiment of the device according to the invention mounted on a three-axle low-loading saddle trailer 101. Device 101 has a housing 103 surrounding a system 102, merely indicated in FIG. 5 by a continuous line. As is also evident from FIG. 6, a rod 105 is located on the back 104 of housing 103 slightly below the top of the housing, with the rod being able to be inserted into the interior of the housing during transport of the system and can be pushed out again at the site. An awning 106 can be mounted on the rod, for example, as protection against rain. During operation of the device according to the invention, a leading belt 107 is located beneath the rod 105 as well as awning 106, onto which belt the material to be comminuted is initially placed. The material and feed material can also be sorted further on feed belt 107 if desired. From feed belt 107 the material travels onto a conveyor belt 108 designed as a rising belt, which is likewise located beneath awning 106 during operation. Feed belt 107 as well as the rising belt 108, like the rod 105, can be slid into the interior of housing 103 during transport (dashed lines in FIG. 5).

Above rising belt 108 a metal detector 109 is located. When metal particles are detected, conveyor belt 108 stops and the material that had remained concealed during the sorting process can be removed manually. In this manner, assurance is provided that to the greatest degree possible only mixed plastics get into preliminary comminutor 110 by the rising belt 108, with the comminutor 110 preferably, being constructed as a mill and having a chute. The preliminary comminutor or preliminary cutting mill 110 with chute is not only capable of comminuting pure mixed plastics but also plastics with metal contaminants such as cans which despite everything have not been sorted out.

In preliminary cutting mill 110 the material is precomminuted to the desired chip size and then travels on a conveyor 111, preferably, a removal or feed screw, directly without intermediate storage into agglomerator 112. This agglomerator 112 uses rotating cutter bars. The plastic chips loaded in the agglomerator chamber are heated by the frictional heat produced by the rotating cutter bars, are agglomerated at approximately 130° C., quenched with water (agglomerator 112 has a water supply for this purpose), broken up a short time later in the same working chamber, and then ejected onto a sieve gutter 113. Sieve gutter 113 is located beneath agglomerator 112 and designed so that the entire batch can be loaded here and fed to a sieve by a metering ram.

Grain separation can take place on the sieve, so that the correct grain is fed in the lower run of sieve gutter 113 through a blower 114 to cyclone 115 by which it can be transported into waiting containers. The oversize grains from sieve gutter 113 pass over a magnetic roller (not shown) into a screw 116. The last metal particles are separated from the plastic by the magnetic roller. The material is fed to a final cutting mill 117 by screw 116. In this mill the material is then cut to the desired grain size. Then the cut material is conveyed by blower 114 into an external storage device, for example, a container silo or the like.

The device also has a generator 118 on saddle trailer 101 in the forward area in front of housing 103 of system 102, said generator being accommodated in a separate housing 119. Below generator 118, a diesel fuel tank 120 is located on either side of saddle trailer 101. In housing 103 the system 102 has a switchboard 121 to control the system. The device also has, both inside housing 103 and externally, illumination 122, 123 so that operation of the system is independent of the time of day.

Instead of preliminary cutting mill 110, a breaker can also be provided. In this fashion, all of the plastic bales that have not been broken up can be loaded by a fork lift into the chute and pre-comminuted by the breaker. The breaker has a slowly rotating shaft into which the plastic bales are forced by a hydraulic ram. The advance of the ram depends on the power draw of the shaft drive motor.

Even such a compactly designed and relatively small device is sufficient at an hourly capacity of 1,000 kg per hour to process up to 2,500 tons annually of the corresponding plastic waste, with this volume of waste corresponding to that of a population of approximately 300,000 for a year. Waste collection sites however, especially in rural areas, are designed for a much smaller number of residents, as few as 1/10 of the quoted figure of 300,000. At such collecting sites a small quantity of the plastic waste under discussion here accumulates which can be processed in only hours or a day, so that a stationary facility is not economical at such a collecting site since it could not work five days a week, let alone around the clock.

It is precisely for such cases that the device according to the invention is an optimum solution, since it can be brought to the corresponding waste collection sites on collect:ion days, perform the processing of the material following the above-mentioned preliminary sorting, and after a working time that lasts several hours or a day, be brought to the next collecting site and so on until it returns to the first waste collection site again in a predetermined rhythm, for example weekly or every two-weeks.

We claim:

1. A method of preparing plastic waste containing different plastics for further processing, the method comprising the steps of comminuting the plastic waste and metallic material into plastic particles and comminuted metallic material, separating the comminuted metallic material from the comminuted plastic particles, agglomerating the plastic particles with rotary knives to partially melt the plastic particles and forcing the partially melted plastic particles through a foraminous structure, and further comminuting the agglomerated plastic particles after being forced through the foraminous structure.

2. A method according to claim 1, wherein the step of comminuting the plastic waste is carried out in two comminution stages prior to the step of agglomeration of the plastic particles.

3. A method according to claim 1, wherein a volume of the plastic particles are fed by force during the comminuting of the plastic and metallic material.

4. A method according to claim 1, wherein the method includes a separation of the metallic material prior to the comminuting of the plastic and metallic material.

5. A method according to claim 4, wherein the step of separation of the metallic material includes detecting a presence of the metallic material and removing of the detected metallic material.

6. A method according to claim 1, wherein, in the step of comminuting the plastic waste and metallic material, the plastic waste is comminuted to a particle size of approximately 10 mm.

7. A method according to claim 1, wherein the metallic material includes magnetizable metals, and wherein the magnetizable metals are removed from the plastic waste by magnets.

8. A method according to claim 7, wherein the magnetizable metals are removed from the plastic waste by a magnetic roller.

9. A method according to claim 8, wherein the plastic parts during the comminuting of the plastic waste and metallic material are comminuted to a size of 3 mm or less.

10. A method according to claim 9, wherein after the comminuting of the plastic waste and metallic material the comminuted plastic waste is subsequently cooled prior to agglomerating the plastic particles.

11. A method according to claim 10, wherein the cooling is effected in stages with a final temperature of the comminuted plastic particles being about 40° C.

12. A method according to claim 1, wherein the metallic material includes non-ferous metals, and wherein, the non-ferrous metals are removed by electrostatic separation.

13. A method according to claim 1, wherein the comminuted plastic particles are intermediately stored prior to the step of agglomeration to ensure a continuous agglomeration process.

14. A method according to claim 1, wherein the plastic particles are melted prior to the step of agglomeration.

15. A method according to claim 14, further comprising the step of cooling the plastic particles.

16. A method according to claim 1, wherein, subsequent to the step of agglomerating, the plastic particles are quenched with a coolant.

17. A method according to claim 1, wherein, subsequent to the step of agglomeration, the plastic particles are cooled.

18. A method of preparing plastic waste containing different plastics for further processing, the method comprising the steps of comminuting the plastic waste and metallic material into plastic particles and comminuted metallic material, separating the comminuted metallic material from the comminuted plastic particles, agglomerating the plastic particles with rotary knives to partially melt the plastic particles and forcing the partially melted plastic particles through a foraminous structure, further comminuting the agglomerated plastic particles after being forced through the foraminous structure, and subsequent to the step of agglomeration, separating plastic particles having a given particle size from a remainder of the plastic particles with the remainder of the plastic particles including magnetizable metals and wherein the magnetizable metals are separated from the plastic particles.

19. A device for preparing plastic waste containing different plastics for further processing, the device comprising a comminution device for comminuting the plastic waste and metallic material into plastic particles and comminuted metallic material, a separator for separating the metallic materials from the comminuted plastic particles, at least one agglomerator for agglomerating the plastic particles having rotary knives which partially melt the plastic particles and a foraminous structure for receiving the partially melted plastic particles to shred the partially melted plastic.

20. A device according to claim 19, further comprising a feed device including a preliminary comminution device for comminuting voluminous parts of the plastic waste into plastic particles during a feeding of the plastic waste.

21. A device according to claim 20, wherein the preliminary comminution device comprises cutting mills.

22. A device according to claim 20, wherein the feed device further includes a hydraulically actuated feed ram for feeding the plastic waste by force.

23. A device according to claim 19, wherein the comminution device includes a shredder for shredding the plastic waste into plastic particles having the size of 10×10 mm.

24. A device according to claim 19, wherein a preliminary cutting mill with a chute is provided before the comminution device for reducing the plastic waste into plastic particles having a particle size of 10×10 mm.

25. A device according to claim 24, wherein a metal detector is disposed upstream of the preliminary cutting mill, as viewed in a feed direction of the plastic waste.

26. A device according to claim 19, wherein the separator includes an overhead belt magnet for removing magnetizable or ferrous metallic material from the plastic waste.

27. A device according to claim 19, wherein an electrostatic separator is provided for separating non-ferrous metallic material from the plastic waste.

28. A device according to claim 19, further comprising an intermediate storage device for ensuring a continuous feed of plastic particles to the at least one agglomerator, said intermediate storage device being disposed upstream of the at least one agglomerator, as viewed in a flow direction of the plastic waste.

29. A device according to claim 28, wherein the intermediate storage device is mounted on the at least one agglomerator so that the plastic particles are gravity fed into the at least one agglomerator.

30. A device according to claim 19, wherein a cooling device is located downstream of the at least one agglomerator, as viewed in a flow direction of the plastic waste.

31. A device according to claim 19, wherein a system for supplying water for quenching the plastic particles is connected to said at least one agglomerator.

32. A device according to claim 19, wherein the comminution device includes a final cutting mill disposed downstream of the at least one agglomerator, as viewed in a feed direction of the plastic waste.

33. A device according to claim 32, wherein a cooling device is located downstream of the at least one agglomerator, as viewed in the feed direction of the plastic waste, for cooling the plastic particles.

34. A device for preparing plastic waste containing different plastics for further processing, the device comprising a comminutor for comminuting the plastic waste and metallic material into plastic particles and comminuted metal material, a separator for separating metallic materials from the comminuted plastic materials and at least one agglomerator for agglomerating the plastic particles, wherein the at least one agglomerator includes a sieve and rotary knives for forcing the plastic particles through the sieve after a melting of the plastic particles due to heat generated by friction of the rotary knives and the plastic particles.

35. A device for preparing plastic waste containing different plastics for further processing, the device comprising a comminutor for comminuting the plastic waste and plastic material into plastic particles and comminuted metal material, a separator for separating metallic materials from the comminuted plastic particles, at least one agglomerator for agglomerating the plastic particles, and a sieve gutter for separating the agglomerated plastic particles which is disposed downstream of the at least one agglomerator, as viewed in a flow direction of the plastic waste.

36. A device according to claim 35 wherein:
the sieve gutter separates ferrous material contained in the metallic materials from the agglomerated plastic particles.

37. A device according to claim 35 further comprising:
a blower disposed downstream from a lower run of the sieve gutter and a cyclone for transporting plastic particles separated from the plastic waste.

\* \* \* \* \*